United States Patent
Shi et al.

(10) Patent No.: US 9,917,519 B2
(45) Date of Patent: Mar. 13, 2018

(54) FREQUENCY HOPPING FOR REDUCING SWITCHING NOISE IN A SWITCHING POWER CONVERTER

(71) Applicant: Dialog Semiconductor Inc., Campbell, CA (US)

(72) Inventors: John Shi, Campbell, CA (US); John Kesterson, Campbell, CA (US); Cong Zheng, Campbell, CA (US); Kai-Wen Chin, Campbell, CA (US)

(73) Assignee: DIALOG SEMICONDUCTOR INC., Campbell, CA (US)

(*) Notice: Subject to any disclaimer, the term of this patent is extended or adjusted under 35 U.S.C. 154(b) by 27 days.

(21) Appl. No.: 15/005,889

(22) Filed: Jan. 25, 2016

(65) Prior Publication Data
US 2017/0214320 A1     Jul. 27, 2017

(51) Int. Cl.
*H02M 3/335*     (2006.01)
*H02M 1/12*      (2006.01)

(52) U.S. Cl.
CPC ......... *H02M 3/33507* (2013.01); *H02M 1/12* (2013.01)

(58) Field of Classification Search
CPC . H02M 2001/0032; H02M 2001/0035; H02M 3/156; H02M 3/1566; H02M 3/157; H02M 3/33523
See application file for complete search history.

(56) References Cited

U.S. PATENT DOCUMENTS

| | | | | |
|---|---|---|---|---|
| 2005/0213358 A1* | 9/2005 | Feldtkeller | ........ | H02M 3/33523 363/95 |
| 2014/0133193 A1* | 5/2014 | Tzeng | ................ | H02M 3/33523 363/21.15 |
| 2015/0062981 A1* | 3/2015 | Fang | ................. | H02M 3/33507 363/21.17 |
| 2015/0070954 A1* | 3/2015 | Huang | ............... | H02M 3/33523 363/89 |
| 2016/0105116 A1* | 4/2016 | Chang | ............... | H02M 3/33523 363/21.13 |
| 2016/0156271 A1* | 6/2016 | Nishijima | ......... | H02M 3/33523 363/21.12 |

* cited by examiner

*Primary Examiner* — Jue Zhang
*Assistant Examiner* — Lakaisha Jackson
(74) *Attorney, Agent, or Firm* — Haynes and Boone, LLP

(57) ABSTRACT

A switching power converter is configured to control switching noise by implementing a plurality of pulse width modulation modes of operation. The peak current in each pulse width modulation mode of operation is controlled so that an output power for the switching power converter is continuous with regard to transitions between the pulse width modulation modes.

18 Claims, 5 Drawing Sheets

FREQUENCY HOPPING FOR REDUCING SWITCHING NOISE IN A SWITCHING POWER CONVERTER

TECHNICAL FIELD

This application relates to switching power converters, and more particularly to pulse-width-modulation frequency hopping for switching power converter noise reduction.

BACKGROUND

The explosive growth in mobile electronic device usage such as smartphones and tablets creates an increasing need in the art for compact and efficient switching power converters so that users may recharge these devices. Flyback switching power converters are typically provided with mobile devices as their transformers provides safe isolation from AC household current and high efficiency. In a flyback switching power converter, a power switch cycles on and off to transfer power to a load through a transformer. A flyback switching power converter will thus produce switching noise that depends upon the frequency of the power switch cycling.

The resulting switching noise may interfere with the touchscreen operation in the powered smartphone or tablet. In that regard, a touchscreen may be driven with a sensing signal having a certain frequency such as 300 KHz. If the flyback switching noise is within the same frequency band used for the touchscreen sensing signal, the touchscreen operation may have interference from the switching noise. Modern high-sensitivity touchscreens are particularly susceptible to such interference. For example, touchscreens have been developed such that users may interact with the touchscreens even while wearing gloves. This increased sensitivity for touchscreens heightens their sensitivity to flyback switching power converter switching noise. Given this sensitivity, it is conventional for a touchscreen controller to monitor the noise across potential frequency bands for the sensing signal so that the sensing signal frequency may be chosen accordingly. For example, a flyback switching power converter may operate at a certain switching frequency such as 80 KHz. The resulting switching noise will then be centered not only around 80 KHz but also at harmonics of the power switch cycling frequency such as 160 KHz, 240 KHz, 320 KHz, and so on. The touchscreen controller may then choose 300 KHz for its signal sensing frequency as the noise will be relatively light in between the 240 KHz and 320 KHz harmonics.

If the power switch cycling were then fixed such as at 80 KHz, a touchscreen controller could readily avoid switching noise. But a flyback switching power converter must also meet certain load efficiency standards. To satisfy the required efficiency at a low load such as at 10% of maximum power, it is conventional for a flyback switching power converter controller to transition out of a fixed frequency pulse-width-modulation (PWM) mode used for higher load states to a pulse frequency modulation mode (PFM) in which the pulse width is fixed but the pulse frequency is reduced as the load drops. For example, the switching frequency of the PFM mode may vary from some maximum frequency such as 80 KHz to a much lower frequency such as 100 Hz. The resulting wideband operation makes it difficult for the touchscreen controller to find a noise-free band for driving its sensing signal.

Accordingly, there is a need in the art for improved switching power converters that maintain efficiency while reducing switching noise.

SUMMARY

To reduce switching noise interference while maintaining efficiency, a switching power converter is provided having a controller that regulates a power switch cycling responsive to a control voltage. The controller includes a feedback loop for generating the control voltage responsive to sensing the output voltage. To prevent spreading of the switching noise in response to load changes, the controller pulse-width modulates the power switch cycling over a plurality of fixed frequencies that are selected based upon the control voltage. Since the control voltage depends upon the power demand from the load, the controller is thus selecting from the plurality of fixed frequencies responsive to the output power for the switching power converter. For example, the switching power converter may pulse-width-modulate the power switch according to a first switching frequency if the output power ranges from a maximum output power to a first output power level. Should the load demand decrease such that the output power drops below the first output power level, the switching power converter controller pulse-width-modulates the power switch according to a second switching frequency that is lower than the first frequency.

The peak current in each power switch cycle is controlled responsive to the control voltage such that the output power for the switching power converter is continuous with respect to transitions between the first switching frequency and the second switching frequency. These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
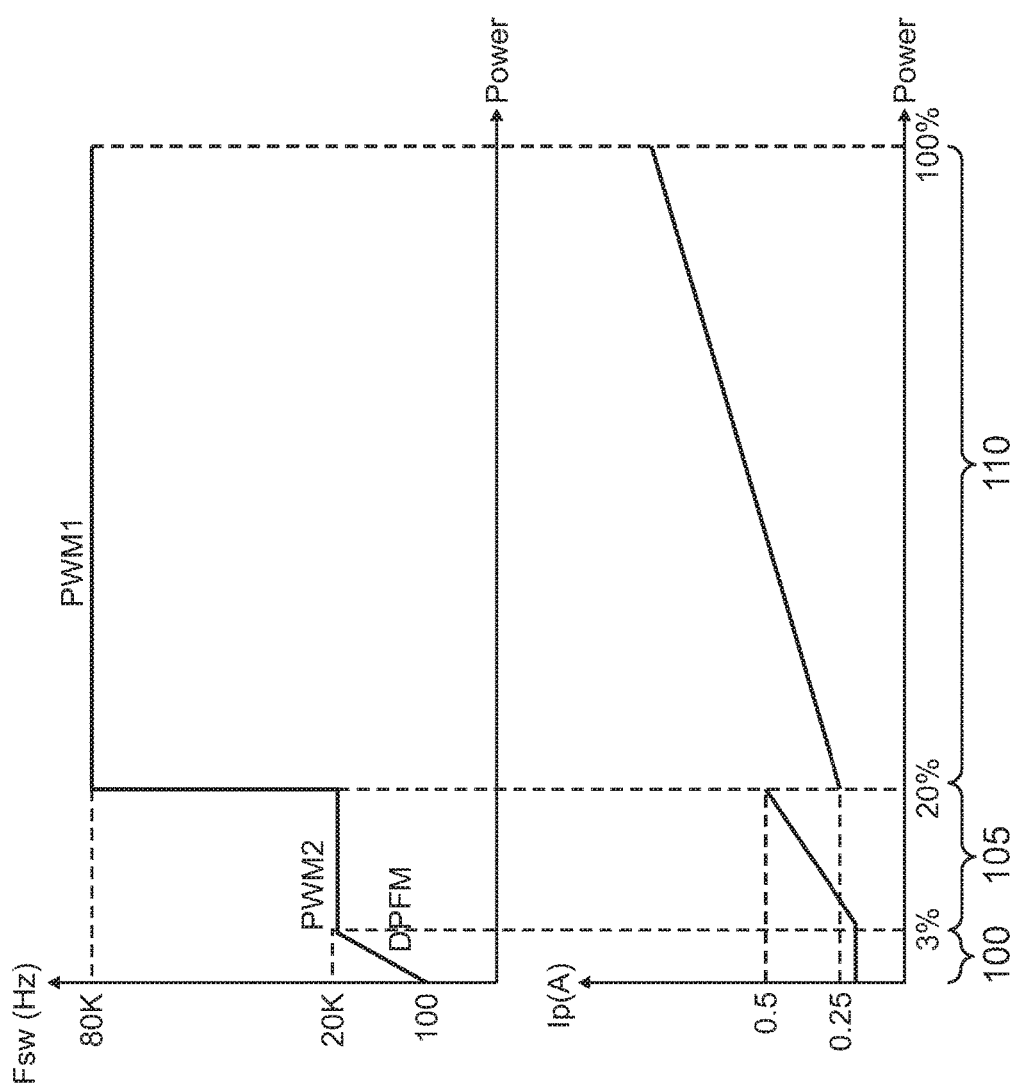
FIG. 1 is a graph of the switching frequencies and peak currents as a function of the percent output power for a switching power converter using two PWM modes of operation and a PFM mode of operation in accordance with an aspect of the disclosure.

To reduce switching noise while maintaining efficiency, a switching power converter is provided with a controller that selects from a plurality of switching frequencies for corresponding pulse-width-modulation (PWM) modes depending upon the power demand from a load. In that regard, the power demand ranges from zero (no load) to a maximum load that corresponds to the maximum power output from the switching power converter. This load demand range (which may also be denoted as a power demand range) is divided into a plurality of bands ranging from a maximum PWM power range to a minimum PWM power range. Each PWM power range has a corresponding switching frequency for the cycling of the power switch. The switching frequencies scale according to the corresponding PWM power range such that a maximum PWM switching frequency is used for the maximum PWM power range whereas a minimum PWM switching frequency is used for the minimum PWM power range.

The minimum PWM power range does not start at zero load but instead starts at some relatively small percentage of maximum power (e.g., 3% of maximum power). Below this beginning load value, the controller switches to a pulse frequency modulation (PFM) mode of operation over which the switching frequency is varied from some lowest switching frequency (e.g., 100 Hz) to the minimum switching frequency used for the minimum power range. In this fashion, efficiency is increased for very low load conditions. The PFM mode is thus used when the load ranges from zero to the beginning load value for the minimum power range. This very lowest power range is denoted herein as the minimum PFM power range. The total power range (zero load to maximum power output) thus ranges from the minimum PFM power range to the minimum PWM power range, and so on to the maximum PWM power range. Since the load determines which mode of operation the controller operates in, the controller needs to determine the current load for the switching power converter. In that regard, the controller includes a feedback loop that generates a control signal that is used by the controller as a proxy for the current load level. The following discussion will assume that the control signal is a control voltage (Vc) but it will be appreciated that a control current could also be used to represent the current load in alternative embodiments.

The controller includes an error amplifier that generates an error signal from amplifying a difference between a feedback signal and a reference signal. The error signal is filtered to produce the control voltage Vc. Based upon the control voltage Vc amplitude, the controller selects from the various modes: if the control voltage Vc is within a minimum PFM control voltage range corresponding to the minimum PFM power range, the controller operates in the PFM mode. Conversely, if the control voltage is within a minimum PWM control voltage range that corresponds to the minimum PWM power range, the controller operates in the PWM mode for the minimum PWM switching frequency. Similarly, if the control voltage is within a maximum PWM control voltage range that corresponds to the maximum PWM power range, the controller operates in the PWM mode for the maximum PWM switching frequency.

Since there is a mapping from the power range to the control voltage, the following discussion will simply refer to the control voltage being within some power range for brevity as opposed to indicating that the control voltage is within a control voltage range that maps to some corresponding power range. The resulting mode control is quite advantageous because the great bulk of the total power range is assigned to the various PWM modes, each of which uses a fixed switching frequency. The switching noise will thus be concentrated to the corresponding fixed switching frequencies and their harmonics so that noise sensitive applications such as touchscreens may utilize the relatively-noise-free frequency bands between peak noise regions. But this is not the only advantage of the disclosed switching power converters.

In addition, the controller may be configured to guarantee a continuity of power output despite the transitions between the various PWM modes of operation. To achieve this seamless transition, the controller exploits the proportionality between the peak input current and the control voltage. In the following discussion, the switching power converter is assumed to be a flyback converter but it will be appreciated that the techniques and systems disclosed herein may be widely applied to any suitable switching power converter such as a buck converter or a buck-boost converter. In a flyback converter, the peak input current is the peak primary winding current that is achieved in a given PWM switching cycle. In that regard, the controller selects a pulse width (time on) for a given PWM switching cycle based upon the control voltage Vc. The peak primary winding current ramps up from zero upon the cycling on of the power switch in a given PWM switching cycle to some peak current value that is achieved prior to the cycling off of the power switch. The peak current thus is proportional to the control voltage. In turn, it can be shown that the output power for each PWM mode is proportional to the square of the corresponding control voltage Vc value multiplied by the PWM switching frequency. As the control voltage Vc rises, the controller will switch operation from one PWM mode to another. There is thus a boundary value of the control voltage Vc that separates the two power regimes for the corresponding PWM modes. This boundary value for the control voltage Vc will be denoted as Vc_boundary in the following discussion. The PWM mode corresponding to the higher power regime defined by Vc_boundary will be denoted as a PWM1 mode whereas the PWM mode corresponding to the lower power regime will be denoted as a PWM2 mode.

To assure that the output voltage is regulated smoothly despite the transition from one PWM mode to the other across the Vc_boundary, the output power for the PWM1 and PWM2 mode should substantially equal each other at the Vc_boundary. The power for the PWM1 mode 1 at the VC_boundary may be designated as P_PWM1(Vc_boundary). The peak current for the PWM1 mode 1 at the VC_boundary may similarly be designated as IP_PWM1 (Vc_boundary). The switching frequency for PWM mode 1 may be designated as F_PWM1. With regard to the PWM mode 2, the corresponding power at the Vc_boundary may be designated as P_PWM2(Vc_boundary) whereas the corresponding peak current may be designated as IP_PWM2 (Vc_boundary). Similarly, the switching frequency for the PWM2 mode may be designated as F_PWM2. Given these definitions, the following equation assures continuity of power at Vc_boundary:

$$P\_PWM1(Vc\_boundary)=P\_PWM2(Vc\_boundary).$$

In turn, the proportionality between the square of the peak current and the output powers leads to the following equation:

$$(IP\_PWM1(Vc\_boundary))^2 * F\_PWM1 = (IP\_PWM2(Vc\_boundary))^2 * F\_PWM2$$

Solving for the ratio of peak currents gives the following:

$$IP\_PWM1(Vc\_boundary)/IP\_PWM2(Vc\_boundary) = Sqrt(F\_PWM2/F\_PWM1)$$

where Sqrt represents the square root function. The controller may thus keep the output power from fluctuating (which in turn prevents the output voltage from rippling) despite transitioning PWM modes if the peak current for one PWM mode at the Vc_boundary is proportional to the peak current for other PWM mode at the Vc_boundary according to the square root of the ratio of the switching frequencies. These advantageous features may be better appreciated through a consideration of the following example embodiments.

Turning now to the drawings, FIG. 1 illustrates the shifting frequencies and peak current as a function of percent power for a switching power converter having just two PWM modes. The percent power range is thus divided into three zones. A PFM power range 100 extends between zero and a relatively low percent power value such as 3% power. A minimum PWM power range 105 extends from the upper boundary for minimum PFM power range 100 (in this embodiment, 3% power) to 20% power. A maximum PWM power range 110 extends from the upper boundary for minimum PWM power range 105 (in this embodiment, 20% power) to 100% power. Should the voltage signal Vc correlate to maximum PWM power range 110, the corresponding switching power converter controller (not illustrated) would operate in a PWM1 mode having a corresponding PWM1 switching frequency (F_PWM1) such as 80 KHz. As the voltage signal Vc drops to indicate that the power output has entered minimum PWM power range 105, the controller would switch to a PWM2 mode having a corresponding PWM2 switching frequency (F_PWM2) such as 20 KHz. It will be appreciated that alternative switching frequencies may be used in alternative embodiments. However, keeping the minimum switching frequency F_PWM2 at 20 KHz or higher assures that the resulting switching noise will not be audible to the user. Moreover, assigning the maximum switching frequency F_PWM1 at a multiple of the minimum switching frequency as done in FIG. 1 assures that the harmonics from each switching frequency will overlap with the other, thereby providing relatively noise-free bands between these noise peaks.

Given these frequency assignments, the square root of the ratio (F_PWM2/F_PWM1) is 0.5. The peak current ratio I_PWM1/I_PPWM2 for the peak current in the corresponding modes should thus equal 0.5 to assure equal output powers for the two PWM modes at their boundary (20% power). In this embodiment, the peak current for the PWM2 mode at this boundary equals 0.5 (the units are arbitrary). On this same current scale, the peak current for the PWM1 mode at this boundary should thus equal 0.25. In each PWM mode, the peak current is proportional to the percent power (which is equivalent to the peak current being proportional to the control voltage Vc discussed above). The peak current in each mode thus increases linearly with the increase in percent power. For example, the peak current IP_PWM1 for the PWM1 mode may be represented by a linear function of the percent power as: IP_PWM1=A1*(percent power–B1). Given the boundary conditions just discussed to maintain continuity of output power, the peak current IP_PWM2 for the PWM2 mode would then be represented by a linear function of the percent power as: IP_PWM2=2A1*(percent power–B1). It will be appreciated that these equations may be recast as linear functions of the control voltage Vc since the control voltage Vc is a proxy for the percent power of the corresponding switching power converter. Note that as used herein, "percent power" is used to denote "percent of the maximum output power" for brevity. The maximum switching frequency for the PFM power range equals the F_PWM1 (in this embodiment, 20 KHz) and declines from this maximum power as the percent power declines until some minimum switching frequency (e.g. 100 Hz) at zero percent power.

Figure 2:
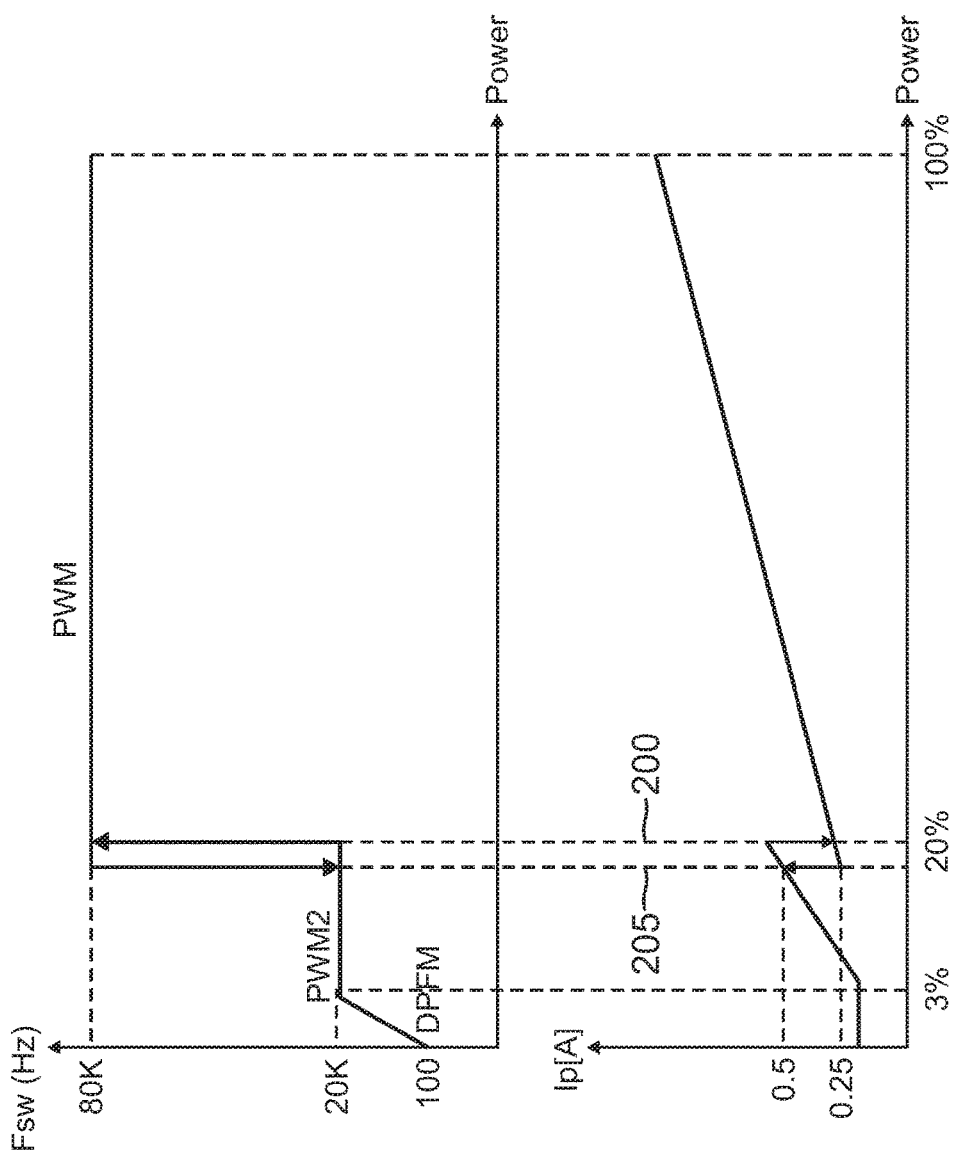
FIG. 2 is a graph of the switching frequencies and peak currents as a function of the percent output power for a switching power converter using two PWM modes of operation and a PFM mode of operation in which hysteresis is used for transitions between the two PFM modes of operation in accordance with an aspect of the disclosure.

In theory, tying the ratio of the peak currents at the boundaries between PWM modes according to the square root of the ratio of the switching frequency makes the output powers identical at the transitions between PWM modes. However, in reality the power levels may not match exactly due to factors such as non-ideal switching frequencies and power switch turn-off delays. To prevent the controller from switching back and forth between modes in an unstable fashion, the controller may be configured to add hysteresis to the PWM mode transitions. For example, the boundary between two corresponding PWM modes may be spaced apart according to a hysteresis value. The control voltage Vc boundary may thus become two different control voltage Vc boundaries depending on whether the transition is from a greater power regime to a lower power regime or from a lower power regime to a greater power regime. For example, the switching frequencies and peak currents as a function of percent power are shown in FIG. 2 for a hysteresis embodiment having two PWM modes of operation. A first boundary 200 such as 20% power separates a lower power range regime for a PWM2 mode of operation from a higher power range regime for a PWM1 mode of operation analogously as discussed with regard to FIG. 1. But first boundary 200 is used only with regard to transitioning from the PWM2 mode to PWM1 mode. A second boundary 205 that is smaller than the first boundary 200 (e.g., approximately 18% power) is used when transitioning from the PWM1 mode to the PWM2 mode. The resulting hysteresis between the two boundaries 200 and 205 prevents the corresponding controller from oscillating between modes in an undesirable fashion.

Figure 3:
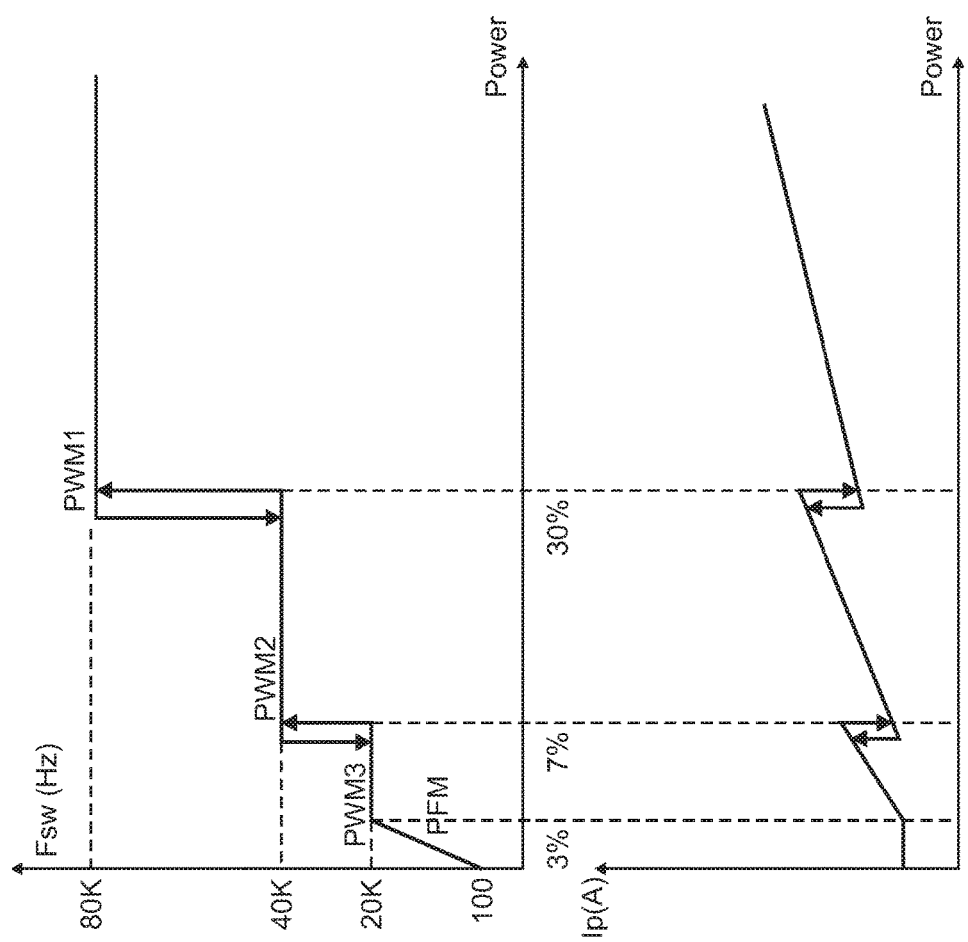
FIG. 3 is a graph of the switching frequencies and peak currents as a function of the percent output power for a switching power converter using three PWM modes of operation and a PFM mode of operation in which hysteresis is used for transitions between the three PFM modes of operation in accordance with an aspect of the disclosure.

It will be appreciated that the number of PWM modes may be greater than two in alternative embodiments. For example, the switching frequencies and peak currents as a function of percent power are shown in FIG. 3 for an embodiment having three PWM modes of operation. A PWM3 mode of operation uses a 20 KHz switching frequency over a lower power band such as ranging from 3% power to 7% power. A PWM2 mode of operation uses a 40 KHz switching frequency over a middle power band such as ranging from 7% power to 30% power. A PWM1 mode of operation uses an 80 KHz switching frequency over a higher power band such as ranging from 30% to 100% power. The boundaries between the various PWM modes may be divided into two boundaries to provide hysteresis analogously as discussed with regard to FIG. 2.

Figure 4:
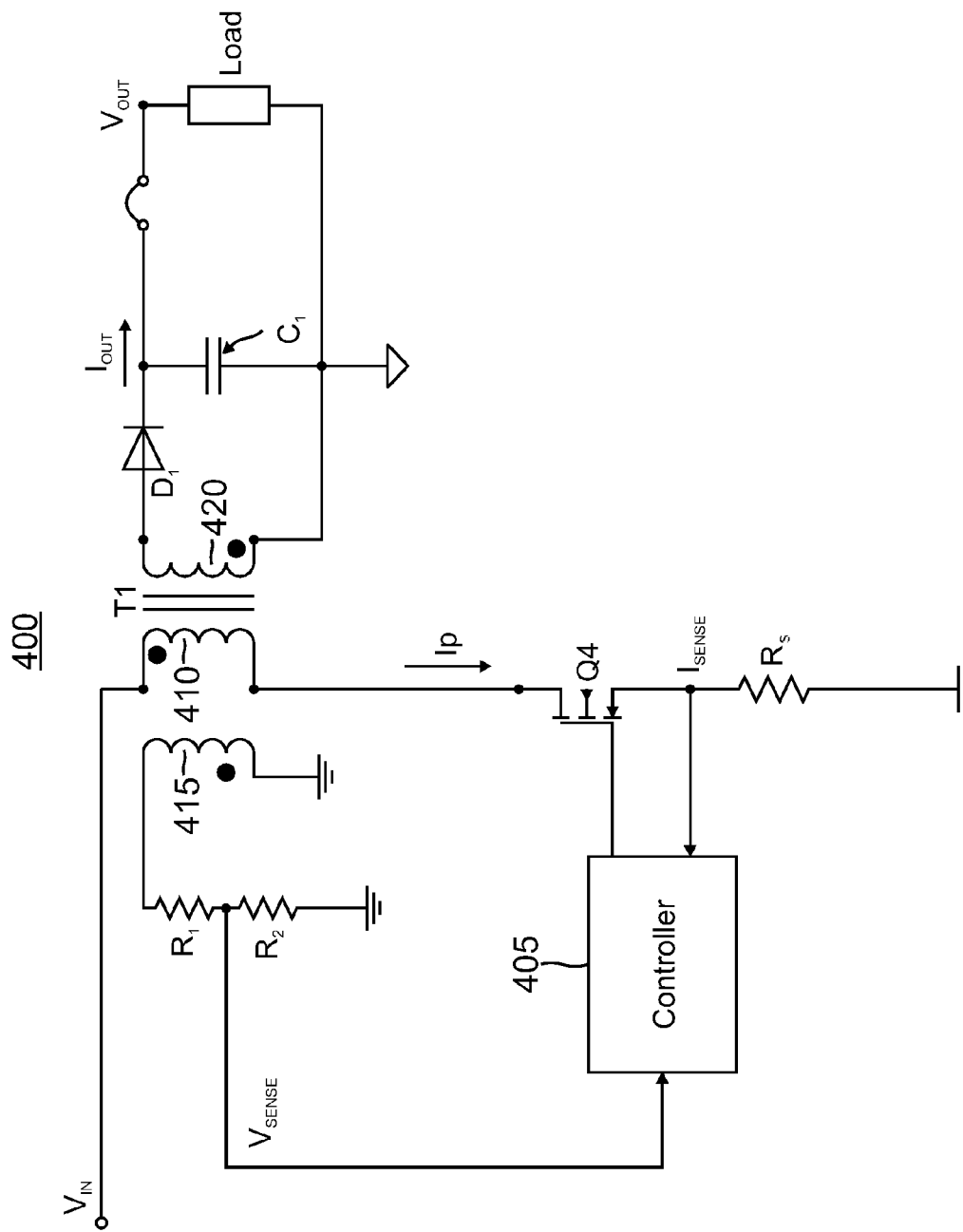
FIG. 4 is a diagram of a flyback converter in which the controller is configured to implement a plurality of PWM modes of operation with power matching at the transitions between the PWM modes of operation in accordance with an aspect of the disclosure.

As discussed above, any suitable switching power converter may be configured to practice the advantageous PWM modes and power matching disclosed herein. An example flyback switching converter 400 is shown in FIG. 4 having a controller 405 configured to practice the disclosed PWM modes and power matching. A rectified input voltage ($V_{IN}$) drives a primary winding 410 of a transformer T1 when controller 405 switches on a power switch transistor Q4. In flyback switching power converter 400, power switch transistor Q4 is a MOSFET (NMOS) transistor but it will be appreciated that bipolar junction transistor (BJT) power switches may be used in alternative embodiments. To cycle the power switch transistor Q4 on, controller 405 charges its gate. Based upon the rectified input voltage $V_{IN}$ and a magnetizing inductance for the transformer T1, a primary winding current in primary winding 410 then ramps up from zero to a peak current value, whereupon controller 405 switches off power switch transistor Q4 to complete a switching cycle. To sense when the desired peak current has been achieved, controller receives an $I_{SENSE}$ signal such as from the voltage on a sensing resistor $R_S$ coupled between the source of power switch transistor Q4 and ground. Controller 405 controls the peak primary current responsive to a feedback voltage ($V_{SENSE}$) derived from a reflected voltage on an auxiliary winding 415. When controller 405 switches off power switch transistor Q4, a rectifying diode $D_1$ coupled to a second winding 420 of transformer T1 becomes forward biased such that the stored magnetic energy in transformer T1 is delivered as an output voltage $V_{OUT}$ across a load as filtered by a load capacitor $C_1$. It will be appreciated that rectifying diode D1 may be replaced by a synchronous rectification (SR) switch in alternative embodiments. This delivery of energy to the load produces a reflected voltage on auxiliary winding 415 that is a function of the voltage drop across the diode $D_1$ and the output voltage $V_{OUT}$. As this energy delivery is depleted, the current in secondary winding 420 will drop to zero such that there is no voltage drop across diode $D_1$, whereupon the reflected voltage across the auxiliary winding is directly proportional to the output voltage $V_{OUT}$. This time is denoted as the transformer reset time (Trst) and represents the ideal time to sample the reflected voltage through $V_{SENSE}$ to obtain an accurate estimate of the output voltage $V_{OUT}$. It will be appreciated an optocoupler may be used to sense the output voltage $V_{OUT}$ in lieu of such a "primary-only" sensing.

Figure 5:
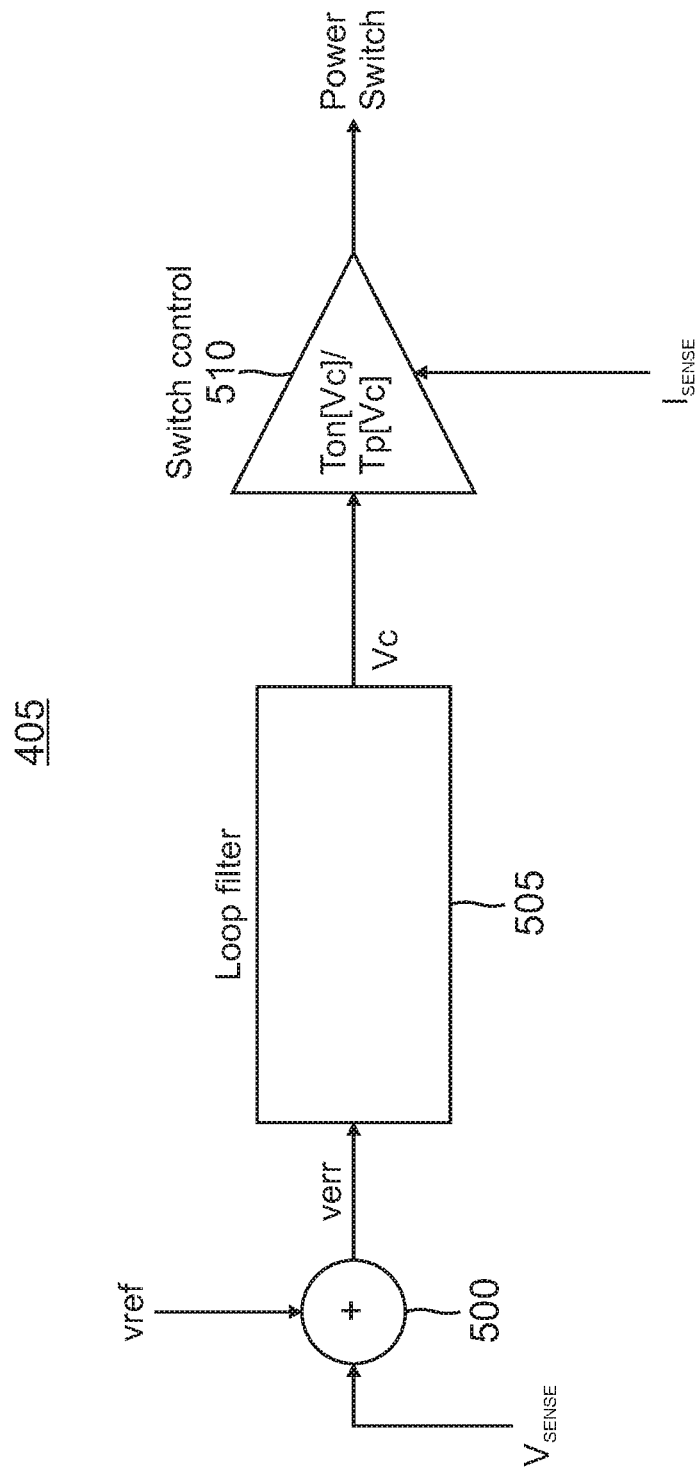
FIG. 5 is a more detailed diagram for the controller of FIG. 4.

Controller 405 is shown in more detail in FIG. 5. A differential amplifier 500 amplifies a difference between the $V_{SENSE}$ feedback voltage and a reference voltage Vref such as a bandgap voltage to provide an error voltage signal Verr to a loop filter. Loop filter 505 filters the error voltage signal Verr to provide the control voltage Vc. A switch control logic circuit 510 determines which band or power range for the PFM and PWM modes includes the amplitude for the control voltage Vc. Should the control voltage Vc amplitude be such that it lies within one of the PWM bands, switch control logic circuit 510 uses the corresponding function to determine the appropriate peak current. For example, if controller 405 is used in the embodiment discussed with regard to FIG. 1 and the control voltage Vc corresponds to minimum PWM power range 105, switch control logic circuit 510 may calculate the peak current using the linear equation A*(Vc−B), where A and B are proportionality constants. The corresponding equation for maximum PWM power range then becomes (A/2)*(Vc−B) as discussed earlier to ensure the continuity of output power at the transition between the two PWM modes. This transition may be performed using hysteresis as discussed with regard to FIGS. 2 and 3. As known in the switching power converter arts, a constant peak current is used during the PFM mode.

Those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter comprising:
    a power switch;
    a controller configured to cycle the power switch at a first switching frequency in a first pulse-width modulation mode to produce a first peak current through the power switch responsive to an amplitude of a control signal being within a first output power range extending from a first minimum power to a first maximum power and to cycle the power switch at a second switching frequency in a second pulse-width modulation mode to produce a second peak current through the power switch responsive to the amplitude of the control signal being within a second output power range extending from the first maximum power to a second maximum power, wherein a first ratio of the first peak current to the second peak current at a boundary between the first output power range and the second output power range equals a square root of a second ratio of the second switching frequency to the first switching frequency.

2. The switching power converter of claim 1, wherein the control signal is a control voltage signal, the switching power converter further comprising:
    a transformer having a primary winding and an auxiliary winding, wherein the power switch is coupled to the primary winding;
    an error amplifier configured to compare a sense voltage derived from the auxiliary winding to a reference voltage to produce an error voltage signal; and
    a loop filter configured to filter the error voltage signal to produce the control voltage.

3. The switching power converter of claim 2, wherein the controller includes a switch control logic circuit configured to determine the first peak current using a first function of the control logic circuit and configured to determine the second peak current using a second function of the control logic circuit.

4. The switching power converter of claim 3, wherein the first function and the second function are both linear functions of the control voltage.

5. The switching power converter of claim 1, wherein the controller is further configured to configured to cycle the power switch at a third switching frequency to produce a third peak current through the power switch responsive to an amplitude of a control signal being within a third output power range.

6. The switching power converter of claim 1, wherein first output power range ranges from a maximum output power for the switching power converter to a first output power for the switching power converter, and wherein the second output power range ranges from the first output power for the switching converter to a second output power for the switching power converter, the first output power being greater than the second output power.

7. The switching power converter of claim 6, wherein the controller is further configured to cycle the power switch in a pulse frequency mode having a constant peak current responsive to the amplitude of the control voltage being within a third output power range that ranges from zero output power to the second output power.

8. The switching power converter of claim 6, wherein the controller is further configured to transition from the first switching frequency to the second switching frequency responsive to the control voltage being greater than a first boundary value and to transition from the second switching frequency to the first switching frequency responsive to the control voltage being greater than a second boundary value, wherein the second boundary value is greater than the first boundary value.

9. A method, comprising:
    cycling a power switch for a switching power converter according to a first switching frequency in a first pulse-width modulation mode responsive to an output power for the switching power converter being within a first output power range extending from a first minimum power to a first maximum power;

while said cycling the power switch according to the first switching frequency, controlling a first peak current through the power switch responsive to a first function of the output power;

cycling the power switch according to a second switching frequency in a second pulse-width modulation mode responsive to the output power being within a second power range extending from the first maximum power to a second maximum power; and while said cycling the power switch according to the second switching frequency, controlling a second peak current through the power switch responsive to a second function of the output power, wherein a first ratio of the first peak current to the second peak current at the first maximum power equals a square root of a second ratio of the second switching frequency to the first switching frequency.

10. The method of claim 9, wherein the first power range ranges from a maximum output power to a first output power level, the method further comprising transitioning from said cycling the power switch at the first frequency to said cycling the power switch at the second frequency responsive to the output power dropping below the first output power level.

11. The method of claim 10, wherein the first function and the second function are both linear functions.

12. The method of claim 10, wherein the switching power converter is a flyback converter.

13. The method of claim 10, further comprising transitioning from said cycling the power switch at the second frequency to said cycling the power switch at the first frequency responsive to the output power rising above a second output power level that is greater than the first output power level.

14. The method of claim 10, wherein the first switching frequency is greater than the second switching frequency.

15. The method of claim 14, wherein the first switching frequency is a multiple of the second switching frequency.

16. The method of claim 10, further comprising:
cycling the power switch according to a third switching frequency responsive to the output power being within a third power range; and
while said cycling the power switch according to the third switching frequency, controlling a third peak current through the power switch responsive to a third function of the output power.

17. The method of claim 10, further comprising:
cycling the power switch according to a variable switching frequency responsive to the output power being within a third power range; and
while said cycling the power switch according to the variable switching frequency, controlling a third peak current through the power switch to be a constant value.

18. The method of claim 10, wherein the third power range includes a zero output power for the switching power converter.

* * * * *